United States Patent
Schröder et al.

(10) Patent No.: US 11,099,832 B2
(45) Date of Patent: Aug. 24, 2021

(54) METHOD FOR UPDATING A BOOTLOADER OF A CONTROLLER OF A LIGHT

(71) Applicant: Schreder S.A., Brussels (BE)

(72) Inventors: Helmut Schröder, Wiesbaden (DE); Daniel Brand, Wedemark (DE); Raoul Van Bergen, Bornheim (DE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 16/758,968

(22) PCT Filed: Oct. 26, 2018

(86) PCT No.: PCT/EP2018/079444
§ 371 (c)(1),
(2) Date: Apr. 24, 2020

(87) PCT Pub. No.: WO2019/081726
PCT Pub. Date: May 2, 2019

(65) Prior Publication Data
US 2020/0326928 A1  Oct. 15, 2020

(30) Foreign Application Priority Data

Oct. 26, 2017 (DE) .......................... 102017125172.3

(51) Int. Cl.
*G06F 8/654* (2018.01)
*G06F 8/658* (2018.01)
(Continued)

(52) U.S. Cl.
CPC .............. *G06F 8/654* (2018.02); *G06F 8/658* (2018.02); *G06F 9/4406* (2013.01);
(Continued)

(58) Field of Classification Search
CPC ...... G06F 8/65; G06F 9/4401; G06F 11/3024; G06F 11/328; G06F 8/654; G06F 8/658; G06F 9/4406; G06F 9/4812; H05B 47/175
See application file for complete search history.

(56) References Cited

U.S. PATENT DOCUMENTS 9,372,682 B2 *  6/2016  Sohm ........................ G06F 8/65
2010/0257345 A1 * 10/2010  Tazzari ................... G06F 8/654
713/1

(Continued)

FOREIGN PATENT DOCUMENTS

EP    2453352 A1    5/2012

OTHER PUBLICATIONS

PCT International Search Report and Written Opinion, PCT International Application No. PCT/EP2018/079444, dated Feb. 12, 2019.

*Primary Examiner* — Marina Lee
(74) *Attorney, Agent, or Firm* — McDonnell Boehnen Hulbert & Berghoff LLP (57) ABSTRACT

Method for updating a bootloader of a controller of a light, comprising at least one processor, at least one bootloader storage area, at least one application storage area, and a file storage area, a first bootloader file stored in a first bootloader storage area, said method comprising: transfer-ring to the controller a bootloader updating programme packet provided outside of the controller and which comprises or can generate a bootloader updating file which comprises either a complete up-to-date second bootloader file or programme parts supplementing the first bootloader file to form an up-to-date second bootloader file, storing the bootloader updating file in the file storage area of the controller, and, in the case of a sufficient minimum voltage being available to (Continued)

the controller, writing the first bootloader storage area with the bootloader updating file from the file storage area.

20 Claims, 6 Drawing Sheets

(51) Int. Cl.
  *H05B 47/175* (2020.01)
  *G06F 9/4401* (2018.01)
  *G06F 9/48* (2006.01)
  *G06F 11/30* (2006.01)
  *G06F 11/32* (2006.01)

(52) U.S. Cl.
  CPC ........ *G06F 9/4812* (2013.01); *G06F 11/3024* (2013.01); *G06F 11/328* (2013.01); *H05B 47/175* (2020.01)

(56) References Cited

U.S. PATENT DOCUMENTS

| | | | |
|---|---|---|---|
| 2012/0254599 A1* | 10/2012 | Kim | G06F 9/4401 713/1 |
| 2014/0265919 A1 | 9/2014 | Pope et al. | |
| 2015/0280471 A1* | 10/2015 | Farhi | H02J 7/0071 320/107 |
| 2015/0342011 A1* | 11/2015 | Brochu | H05B 33/08 315/294 |
| 2016/0216957 A1 | 7/2016 | Yoon | |
| 2016/0216978 A1* | 7/2016 | Dangy-Caye | G06F 11/1433 |
| 2017/0075678 A1* | 3/2017 | Kurosawa | G06F 8/65 |
| 2020/0326928 A1* | 10/2020 | Schroder | G06F 8/658 |

* cited by examiner

METHOD FOR UPDATING A BOOTLOADER OF A CONTROLLER OF A LIGHT

CROSS-REFERENCE TO RELATED APPLICATION

The present application is a national stage entry of PCT/EP2018/079444 filed on Oct. 26, 2018, which claims priority to DE 102017125172.3 filed on Oct. 26, 2017, the contents of each of which are hereby incorporated by reference.

The invention relates to a method for updating a bootloader of a controller of a light.

By using controllers built into the lights, modern lighting systems offer a plurality of operating and control possibilities for optimising lighting conditions. For example, brightness, light colour and spectrum can thus be set depending on the situation and the consumption of electricity can be minimised by using timer switches or motion sensors.

In a computer system, such as the controller mentioned at the start, the bootloader is the first programme which is executed after a system reset in order to bring the system into a functioning state. Due to its important function, the bootloader is accommodated within a protected storage area so that the bootloader cannot be inadvertently deleted or corrupted.

Occasionally it is necessary to update the bootloader. For this purpose one must access the secured storage area and the bootloader must be reprogrammed. However, there is the risk here that the bootloader will be corrupted, for example by incomplete updating due to loss of power. The result of this is that the bootloader can no longer bring the system into a functioning state, as a result of which the entire system fails. In an extreme case the controller could be irreversibly destroyed, and the corresponding light rendered unusable.

Therefore, the object underlying the present invention is to provide a method for updating a bootloader of a controller of a light which avoids the disadvantages specified above.

This object is achieved according to the invention by a method for updating a bootloader of a controller of a light, the light being incorporated into a network of lights, the controller comprising at least one processor, at least one bootloader storage area, at least one application storage area, in particular for an application which is, in particular, part of a firmware, and a file storage area, a first bootloader file to be updated being stored in a first bootloader storage area, a bootloader updating programme packet provided outside of the controller and which comprises or can generate a bootloader updating file which comprises either a complete up-to-date second bootloader file or programme parts supplementing the first bootloader file to form an up-to-date second bootloader file, being transferred to the controller, the bootloader updating file being stored in the file storage area of the controller, and in the case of an at least sufficient minimum voltage being available to the controller, the first bootloader storage area being written with the bootloader updating file from the file storage area. Advantageous embodiments of the invention can be gathered from the subclaims and the description that follows.

The controller performs functions relating to monitoring, control, regulation or signal processing in connection with the light or the network of lights. For this purpose the controller has various functional elements, in particular a microcontroller unit and/or a modem unit, and interfaces, in particular a UART interface and/or a radio interface.

The controller is connected to a power supply by means of which it is supplied with an operating voltage. Preferably, the controller has one or more energy stores, in particular in the form of capacitors which supply the controller with a back-up voltage for a certain time following an interruption of the power supply.

The critical step in updating the bootloader of the controller consists in writing the first bootloader storage area comprising the first bootloader file to be updated with the bootloader updating file. In the following this step is referred to as the "writing step". If the bootloader updating file comprises a complete up-to-date second bootloader file, the first bootloader storage area or the first bootloader file is overwritten with the bootloader updating file. If the bootloader updating file comprises programme parts which supplement the first bootloader file to form an up-to-date second bootloader file, the first bootloader file is supplemented with the bootloader updating file to form the up-to-date second bootloader file.

The writing step is only performed on the condition that a sufficient minimum voltage is available to the controller for updating. Within this context, a sufficient minimum voltage is available to the controller if the controller remains supplied with the operating voltage or the back-up voltage for a period of time over which the controller can fully perform the writing step. In this way corruption of the bootloader and the resulting disadvantages are prevented.

Preferably, the writing step is preceded by determination of the amount of voltage available to the controller, this information possibly having to be, moreover, forwarded and/or processed. In the following this operation is referred to as the decision step. It is evident that the sufficient minimum voltage must be interpreted here to be such that the controller remains supplied for a period of time over which the controller can fully perform both the decision step and the writing step.

In a preferred embodiment of the invention, it is determined in connection with the decision step by means of a controller-internal inquiry, whether a sufficient minimum voltage is available to the controller for the updating of the bootloader. The advantage of this is that the controller can reliably and quickly obtain and process the information regarding whether the minimum voltage is available.

In another preferred embodiment of the invention, in connection with the decision step in the case of a minimum voltage not being available to the controller, a status variable is changed from a non-warning status to a warning status, the status variable of an inquiry into its status being accessible by means of the at least one processor. In particular, the programme which should perform the writing step performs the inquiry into the status of the status variables before the writing step. The advantage of this is that the controller can particularly quickly obtain and process the information regarding whether a minimum voltage is available to the controller.

Advantageously, in connection with the decision step in the case of a minimum voltage not being available to the controller, an interruption request is sent to the at least one processor. The processor checks the receipt of the interruption request, and in the case where no interruption request has been sent to the processor, starts the writing step. The advantage of this is that the controller can particularly quickly obtain and process the information regarding whether a minimum voltage is available to the controller.

In a preferred embodiment of the object according to the invention, the first bootloader storage area can be written with the bootloader updating file by means of an operation which comprises a single page write operation. By restricting the extent of the operations required for the writing step, at the same time the required period of time over which the controller must be supplied with voltage is reduced, and so the minimum voltage amount is minimised. Thus, the period of time between the time of the power supply failing and the time up to which a sufficient minimum voltage is available to the controller can be extended, as a result of which the method is more reliable. In particular, commercially available controllers are designed such that they are supplied with a back-up voltage after an interruption of the power supply, at least for a period of time over which a single page write operation can be fully performed. As a result, the method can be applied to existing commercially available controllers, and so cost- and work-intensive conversion of the respective controllers is not necessary.

In another advantageous embodiment of the invention it is checked whether the bootloader updating file, with which the first bootloader storage area was written, and the bootloader activation file from the file storage area are identical. It is evident that the sufficient minimum voltage must be interpreted here such that the controller remains supplied for a period of time over which the controller can fully perform both the writing step and can also check, after the writing step, whether the bootloader updating file, with which the first bootloader storage area was written, and the bootloader activation file from the file storage area are identical. Any errors that occur in the writing of the first bootloader storage area are recognised by the bootloader updating file, as a result of which the method is more reliable.

Advantageously, the bootloader updating programme packet is transferred from a server of the network of lights to the controller by means of a radio interface. The bootloader updating programme packet can be transferred directly from a server to the controller. Preferably, the network of lights is a mesh network. In this case, the bootloader updating programme packet can also be transferred from a server indirectly, in particular via the individual nodes of the mesh network which are formed by further lights and their respective controllers, to the controller. The advantage of this is that the updating of a bootloader, a controller, a light can be performed independently of the accessibility of the light or the controller, as a result of which the method is more reliable. The bootloader updating programme packet can be transferred in all of the ways customary to data transfer, in particular also in bootloader updating programme packet parts which are brought together to form the bootloader updating programme packet at the target location.

In another embodiment of the invention the bootloader updating programme packet comprising the bootloader updating file is deleted after the writing of the first bootloader storage area with the bootloader updating file from the file storage area, and in particular after checking whether the bootloader updating file, with which the first bootloader storage area was written, and the bootloader updating file from the file storage area are identical. The file storage area is therefore cleared as soon as it is no longer required for the updating, and can be used elsewhere by the controller. In this way the storage capacity, in particular in controllers with small memories, is efficiently utilised, and in particular in the case where the application storage area comprises the file storage area and the application is corrupted by the storage of the bootloader updating file in the file storage area, it is made possible to replace the corrupted application with an identical or more up-to-date version, as a result of which the method is more reliable.

The bootloader updating programme packet provided outside of the controller is transferred to the controller and is loaded in particular into the file storage area. The bootloader updating programme packet is preferably loaded by an application running on a first application storage area and which is part of the firmware, into the file storage area. Thus, the updating can be performed during the on-going operation of the controller, as a result of which the method is more user-friendly.

In another preferred embodiment of the invention the bootloader updating programme packet is loaded by the executed first bootloader file into the file storage area. Thus, updating of the bootloader can take place independently and in particular parallel to the application running on the first application storage area which is part of the firmware. The advantage of this is that the controller continues to operate during the updating of the bootloader and can perform its functions, as a result of which the method is more user-friendly.

Preferably, the application running on the first application area and which is part of a firmware writes the first bootloader storage area with the bootloader updating file. Therefore, the writing step does not have to be performed by the bootloader updating programme packet, as a result of which the file size of the bootloader updating programme packet can be minimised. In particular, the bootloader updating programme packet consists here exclusively either of a complete up-to-date second bootloader file or of programme parts that supplement the first bootloader file to form an up-to-date second bootloader file. By minimising the file size of the bootloader updating programme packet, any errors in the transfer to the controller are less likely, as a result of which the method is more reliable.

Alternatively, the first bootloader storage area can be written by the executed bootloader updating programme packet with the bootloader updating file. Thus, updating of the bootloader can take place independently, and in particular parallel to the application running on the first application storage area and which is part of a firmware. The advantage of this is that the controller can continue to perform its functions during the updating of the bootloader, as a result of which the method is more user-friendly.

In a particularly preferred embodiment the controller has a modem unit with a modem unit memory and a microcontroller unit with a microcontroller unit memory, the first bootloader storage area being part of the modem unit memory or of the microcontroller unit memory and/or the first application storage area being part of the modem unit memory or of the microcontroller unit memory and/or the file storage area being part of the modem unit memory or of the microcontroller unit memory. In particular, the microcontroller unit memory has a maximum storage capacity of 128 kB. Preferably, the microcontroller unit and the modem unit each comprise a processor, respectively a bootloader storage area comprising a bootloader file and an application storage area for an application which is part of a firmware. In the course of updating the bootloader of one of these units one can therefore access in particular the free memory of the other unit as support. As a result, there is the advantage that the application running on the application storage area of the unit to be updated does not have to be stopped in the course of updating the bootloader of this unit and the application storage area does not have to be written. The advantage of this is that the unit of the controller to be up-dated can continue to perform its functions during the updating of its bootloader, as a result of which the method is more user-friendly.

Advantageously, the first application storage area comprises the file storage area. The advantage of this is that no additional storage area is required for the updating of the bootloader, as a result of which the method can also be applied to controllers with small memories. Since in the case of the application storage area comprising the file storage area not having sufficient storage capacity to include the application and the bootloader updating file alongside one another it is necessary to stop the application for updating the bootloader, and to overwrite, and so to corrupt it at least with part of the bootloader updating file, an application provided outside of the controller is preferably transferred to the re-started controller. In this way the functionality of the controller is ensured after the updating of the bootloader, as a result of which the method is more reliable.

The application transferred to the re-started controller may be identical here to the original application before the updating of the bootloader or may be an updated version of the application. Therefore, separate updating of the application is unnecessary, as a result of which the method is more user-friendly.

Alternatively, the file storage area can be included by an additional storage area of the controller different from the first application storage area. The advantage of this is that the controller can continue to perform its functions during the updating, as a result of which the method is more user-friendly.

According to another aspect of the invention there is provided a controller for a light which is incorporated into a network of lights, the controller comprising at least one processor, at least one bootloader storage area, at least one application storage area, in particular for an application which is, in particular, part of a firmware, and a file storage area, a first bootloader file to be updated being stored in a first bootloader storage area. The controller is configured for:

receiving a bootloader updating programme packet from outside of the controller, said bootloader updating programme packet comprising or being capable of generating a bootloader updating file which comprises either a complete up-to-date second bootloader file or programme parts supplementing the first bootloader file to form an up-to-date second bootloader file, storing the bootloader updating file in the file storage area of the controller, and, in the case of a sufficient minimum voltage being available to the controller, writing the first bootloader storage area with the bootloader updating file from the file storage area.

Preferred embodiments of the controller are disclosed in the dependent claims. The technical advantages explained above for embodiments of the method apply mutatis mutandis for the controller.

Further details and advantages of the invention can be gathered from the schematically illustrated exemplary embodiments described below; these show as follows.

The features of the exemplary embodiments according to the invention explained below may also be the subject of the invention individually or in combinations different from those illustrated or described, but always together with the features of claim 1. In the following, elements of the invention that have the same effect are provided with a consistent reference number in so far as this is expedient.

Figure 1:
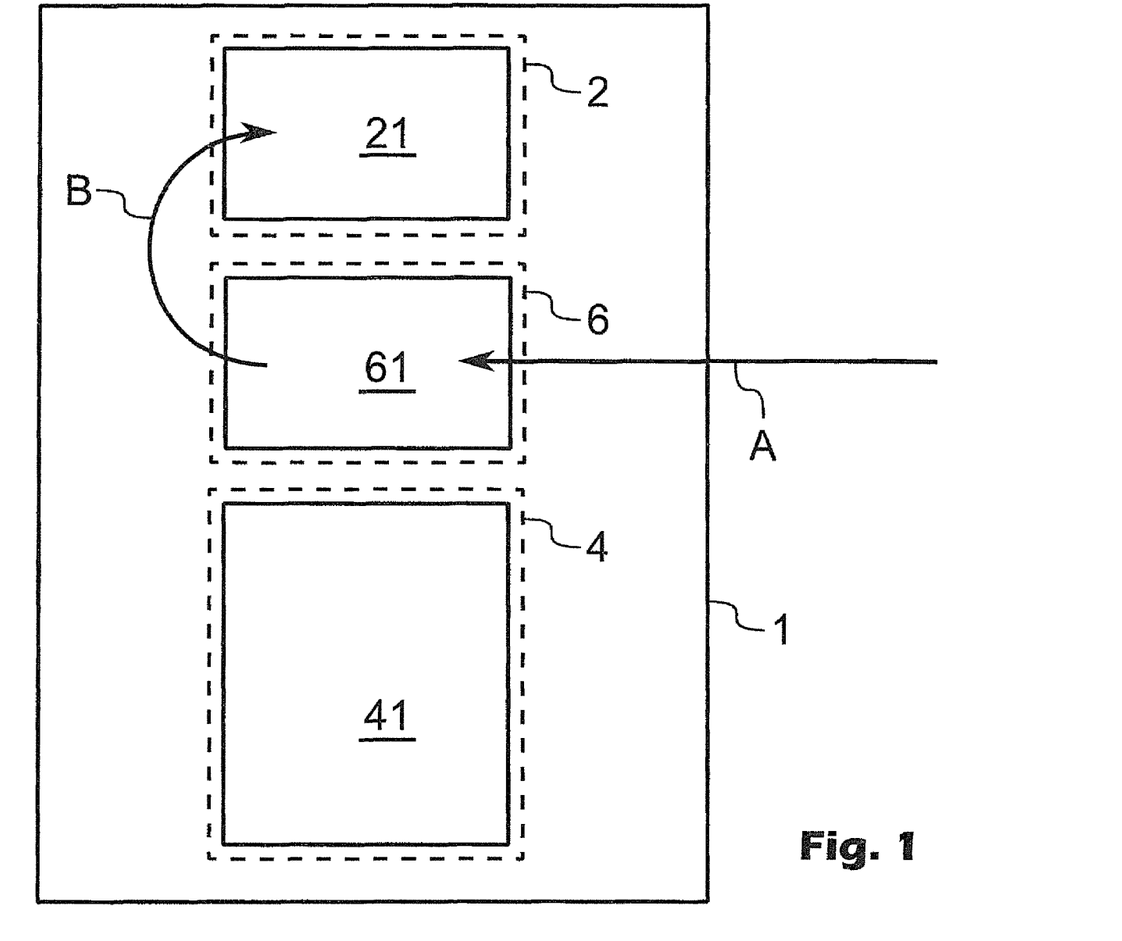
FIG. 1 a block diagram of a controller according to one embodiment of the invention, FIG. 2 a block diagram of a controller according to another embodiment of the invention, FIG. 3 a block diagram of a controller according to another embodiment of the invention, FIG. 4 a block diagram of a controller according to another embodiment of the invention, FIG. 5 a programme flow chart according to another embodiment of the invention, FIG. 6 a programme flow chart according to another embodiment of the invention.

FIG. 1 illustrates diagrammatically: A controller 1 comprising a first bootloader storage area 2, a first application storage area 4 and a file storage area 6. The bootloader storage area 2 contains a first bootloader file 21 that is to be updated. The first application storage area 4 comprises an application 41, in particular a firmware. To update the bootloader a bootloader updating programme packet provided outside of the controller and which in this embodiment consists of a bootloader updating file 61 is first of all transferred to the controller—as shown by arrow A—the bootloader updating file 61 being stored in the file storage area 6 of the controller 1. The file storage area 6 is not included in the first application storage area 4 here, and so an application 41 is not corrupted by writing the file storage area 6 with the bootloader updating file 61. The advantage of this is that the application 41 can continue to perform its function during the updating of the bootloader, as a result of which the method is more user-friendly. In the case of a sufficient minimum voltage being available to the controller 1, the first bootloader storage area 2 is written with the bootloader updating file from the file storage area 6. This step, which is referred to in the following as the "writing step" is shown by the arrow B. The writing step B is only performed if a sufficient minimum voltage is available to the controller 1 for updating. Corruption of the bootloader is thus prevented.

Figure 2:
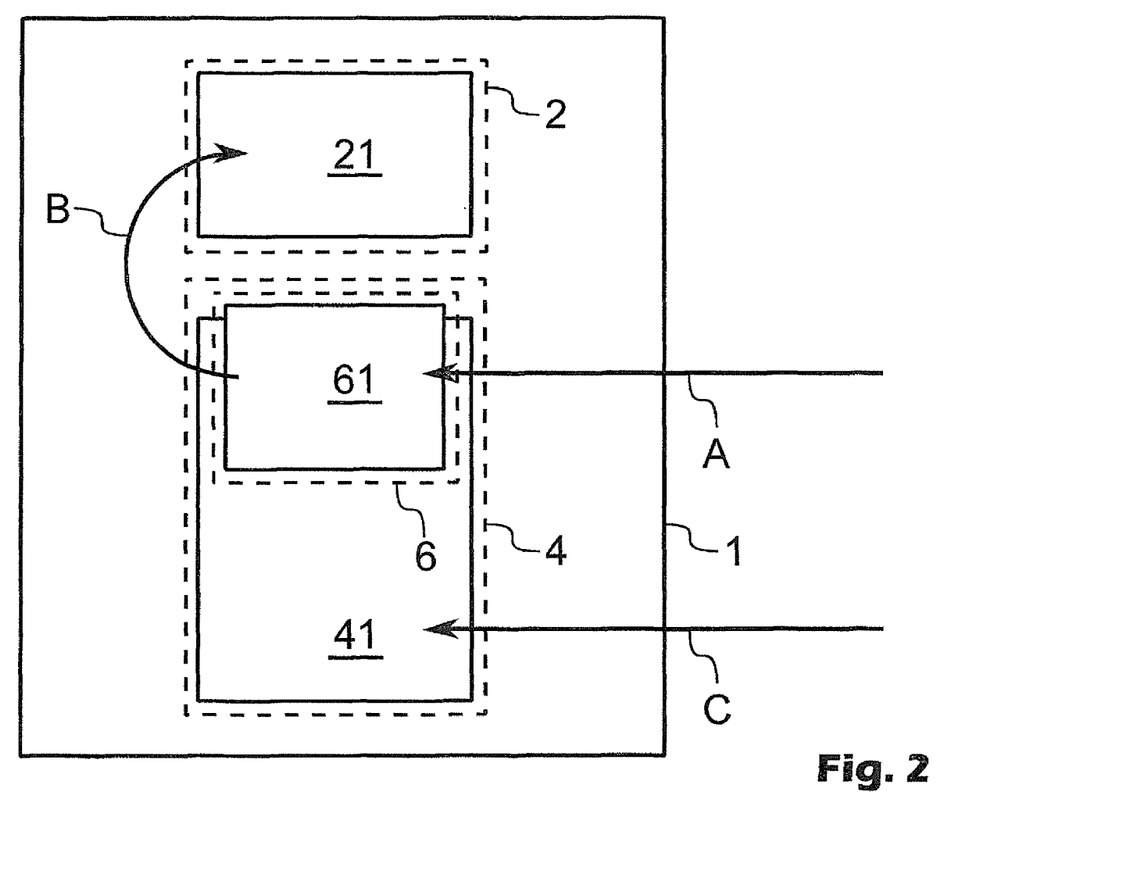

FIG. 2 shows another embodiment of the invention, the first application storage area 4 comprising the file storage area 6. The advantage of this is that no additional storage area is required for the updating of the bootloader, as a result of which the method can also be applied to controllers 1 with small memories. By writing the file storage area 6 with the bootloader updating file 61, in the present case the application 41 is, however, corrupted. Preferably, the application 41 is halted before the writing in order to avoid a malfunction of the controller 1. In the case of a sufficient minimum voltage being available to the controller 1, writing step B is performed. Preferably, the bootloader updating programme packet comprising the bootloader updating file 61 is deleted after the writing step, and in particular after checking whether the bootloader updating file 61, with which the first bootloader storage area 2 has been written, and the bootloader updating file 61 from the file storage area 6 are identical. The file storage area 6 is therefore cleared so that an application provided outside of the controller can be transferred to the controller. This application may be identical to the application 41 contained in the first application storage area 4 before the updating or be a more up-to-date version of the same. In particular, the application provided outside of the controller is transferred to the re-started controller. In this way the functionality of the controller is ensured after the updating of the bootloader.

Figure 3:
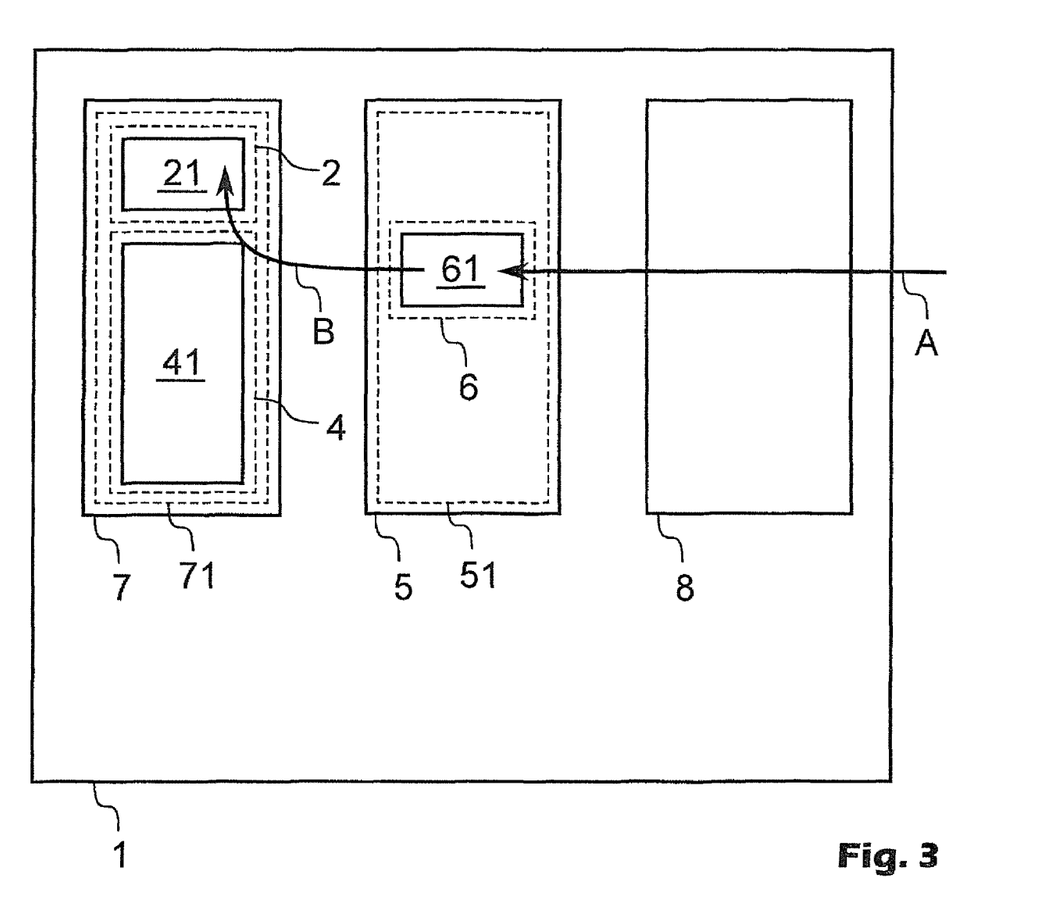

FIG. 3 illustrates diagrammatically a controller 1 which has a modem unit 5 with a modem unit memory 51, a microcontroller unit 7 with a microcontroller unit memory 71 and a transmitter-receiver radio module 8. The microcontroller unit memory 71 has the first bootloader storage area 2 in which there is a first bootloader file 21 to be updated, as well as the first application storage area 4 with an application 41. To update the bootloader of the microcontroller unit 7 the bootloader updating programme packet comprising the bootloader updating file 61 is transferred to the controller—as illustrated by the arrow A—, the bootloader updating file 61 being stored in the file storage area 6. In this case the file storage area 6 is included in the modem unit memory 51. The advantage of this is that the application 41 can continue to perform its function during the updating of the bootloader, as a result of which the method is more user-friendly. In the case of a sufficient minimum voltage being available to the controller 1 the writing step B is performed, as a result of which updating of the bootloader is made possible without corrupting the bootloader. Preferably, the bootloader updating programme packet comprising the bootloader updating file 61 is deleted after the writing step B, and in particular after checking whether the bootloader updating file 61, with which the first bootloader storage area 2 has been written, and the bootloader updating file 61 from the file storage area 6 are identical. The file storage area 6 is therefore cleared, and in this case can then be used by the modem unit 5, as a result of which the method is more reliable.

It goes without saying that this method can also be performed by a bootloader of the modem unit 5 being updated and the file storage area being included by the microcontroller unit memory 71.

Figure 4:
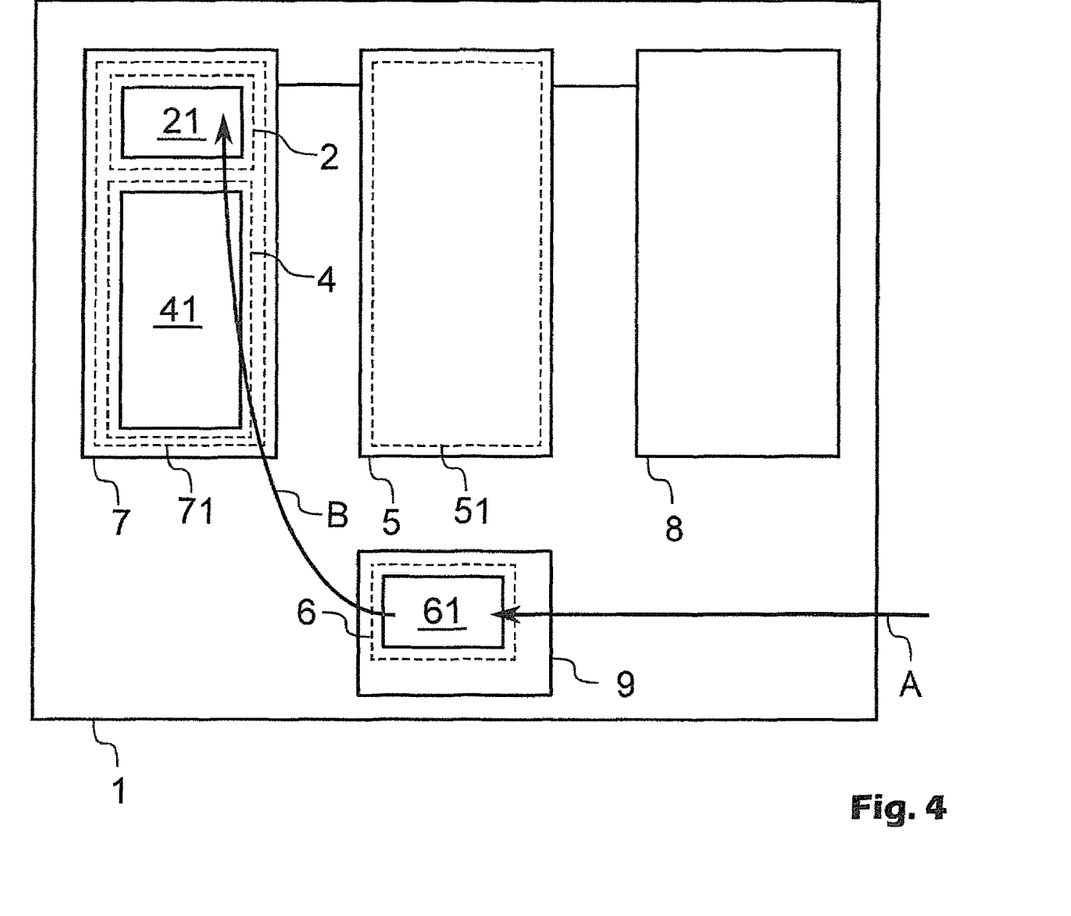

Alternatively, the file storage area 6 may be included by an additional storage area 9 (FIG. 4). The advantage of this is that the modem unit memory 51 or the microcontroller unit memory 71 do not have to be used, and in the case of doubt, data contained in the memories are not overwritten or corrupted either. In this way the method becomes even more reliable.

Figure 5:
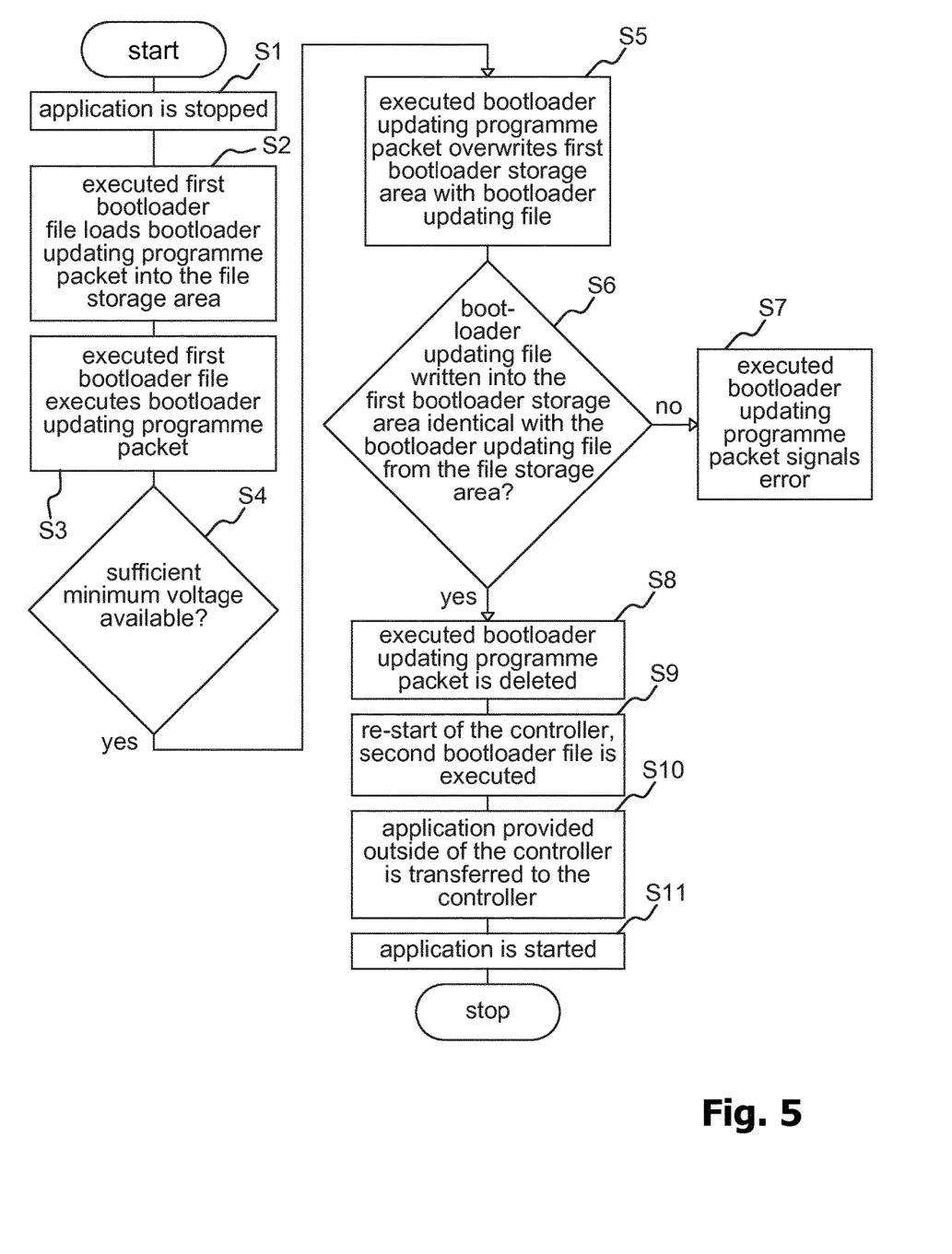

FIG. 5 shows a programme flow chart according to one embodiment of the invention, the first application storage area 4 including the file storage area 6 and not having sufficient storage capacity to include the application 41 and the bootloader updating file 61 alongside one another. First of all, the application 41 is halted (S1). The executed first bootloader file 21 then loads the bootloader updating programme packet into the file storage area 6 (S2) and then performs the bootloader updating programme packet (S3). In the course of executing the bootloader updating programme packet the bootloader updating file 61 is stored in the file storage area 6. There follows a check (S4) regarding whether a sufficient minimum voltage is available to the controller 1 (S6). If this is the case ("yes" path), the bootloader updating programme packet overwrites the first bootloader storage area 2 with the bootloader updating file (S5). There follows a check (S6) regarding whether the bootloader updating file 61 written into the first bootloader storage area 2 is identical to the bootloader updating file 61 from the file storage area 6. If this is not the case ("no" path), the executed bootloader updating programme packet signals an error (S7). If the files checked in S6 are identical ("yes" path), the bootloader updating programme packet which comprises the bootloader updating file 61 is deleted (S8). The controller 1 is then re-started, the new version of the bootloader being executed in the form of the second bootloader file (S9). There follows a step (S10) in which an application 41 provided outside of the controller is transferred to the controller 1. Finally, the application 41 is started (S11).

Figure 6:
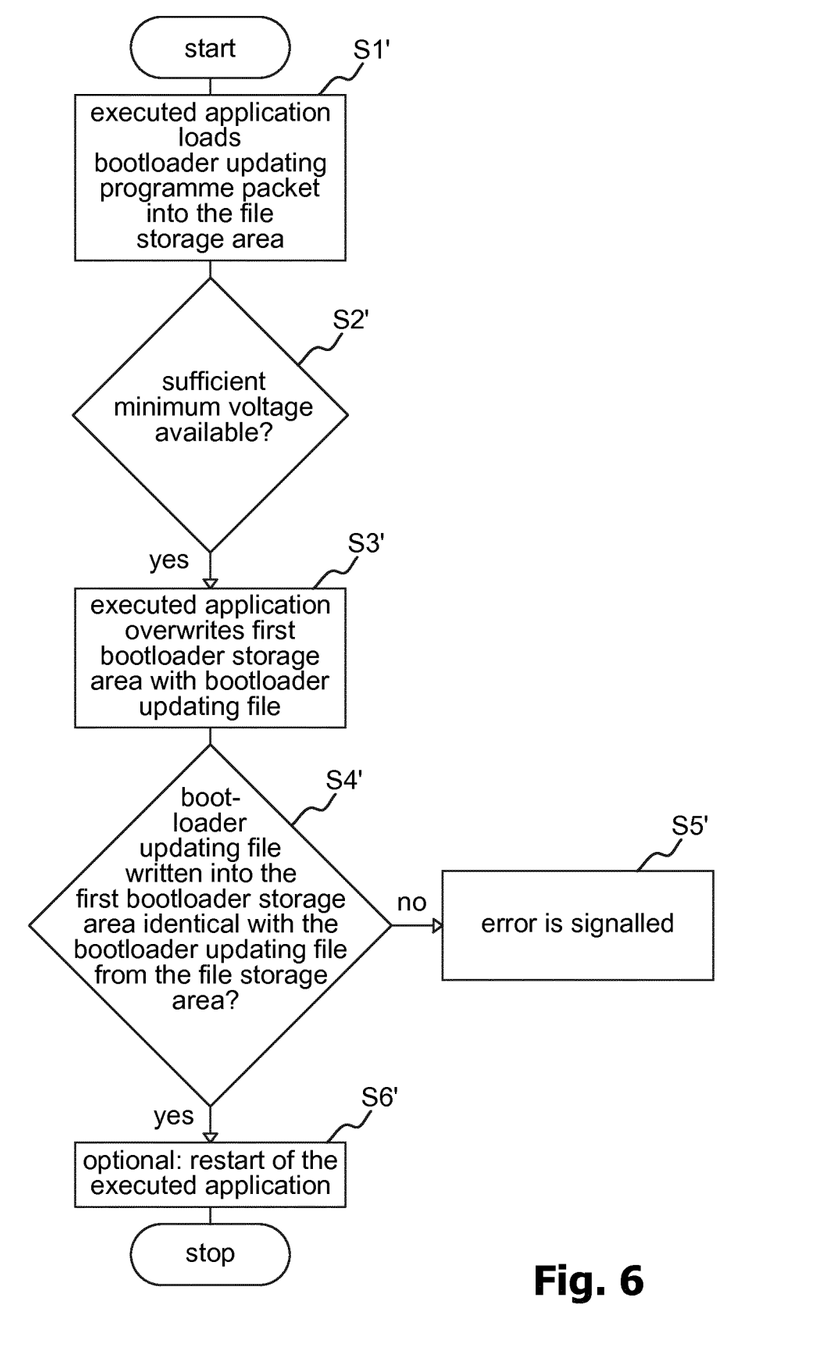

FIG. 6 shows a programme flow chart of another embodiment of the invention, the application storage area 4 not including the file storage area 6 so that an application stored in the application storage area 4 is not corrupted by writing the file storage area 6. First of all here, the executed application 41 loads the bootloader updating programme packet into the file storage area 6 (S1'). It is then checked whether a sufficient minimum voltage is available to the controller 1 (S2'). If this is the case ("yes" path), the executed application 41 overwrites the first bootloader storage area 2 with the bootloader updating file 61 (S3'). Then a check (S4') takes place regarding whether the bootloader updating file 61 written into the first bootloader storage area 2 is identical to the bootloader updating file 61 from the file storage area 6. If this is not the case ("no" path), an error is signalled (S5'). If the files checked in S4' are identical ("yes" path), the executed application 41 can optionally be restarted (S6').

The invention claimed is:

1. A method for updating a bootloader of a controller of a light the controller being connected to a power supply means by means of which it is supplied with an operating voltage, said controller comprising at least one processor, at least one bootloader storage area, at least one application storage area, a file storage area, and optionally one or more energy stores, wherein a first bootloader file to be updated is stored in a first bootloader storage area, said method comprising the steps of:

transferring to the controller a bootloader updating programme packet provided outside of the controller and which comprises or can generate a bootloader updating file which comprises either a complete up-to-date second bootloader file or programme parts supplementing the first bootloader file to form an up-to-date second bootloader file;

storing the bootloader updating file in the file storage area of the controller;

determining an amount of voltage available to the controller; and in the case of a sufficient minimum voltage being available to the controller, writing the first bootloader storage area with the bootloader updating file from the file storage area;

wherein said sufficient minimum voltage is such that the controller remains supplied with the operating voltage or with a back-up voltage of the optional one or more energy stores for a period of time over which the controller can perform the determining and the writing.

2. The method of claim 1, wherein the step of determining is done by means of a controller-internal inquiry whether the sufficient minimum voltage is available to the controller for the updating of the bootloader.

3. The method of claim 1, wherein in the case of the minimum voltage not being available to the controller, a status variable is changed from a non-warning status to a warning status, the status variable of an inquiry into its status being accessible by means of the at least one processor.

4. The method of claim 1, wherein in the case of the minimum voltage not being available to the controller, an interruption request is sent to the at least one processor.

5. The method of claim 1, wherein the first bootloader storage area is written with the bootloader updating file by means of an operation which comprises a single page write operation.

6. The method of claim 1, wherein it is checked whether the bootloader updating file written into the first bootloader storage area and the bootloader updating file from the file storage area are identical.

7. The method of claim 1, wherein the bootloader updating programme packet is transferred from a server of the network of lights to the controller by means of a radio interface.

8. The method of claim 1, wherein the bootloader updating programme packet is deleted after the writing of the first bootloader storage area with the bootloader updating file from the file storage area.

9. The method of claim 1, wherein the bootloader updating programme packet is loaded into the file storage area by an application running on a first application storage area.

10. The method of claim 1, wherein the bootloader updating programme packet is loaded by the executed first bootloader file into the file storage area.

11. The method of claim 1, wherein the first bootloader storage area is written by the executed bootloader updating programme packet with the bootloader updating file from the file storage area.

12. The method of claim 1, wherein the first bootloader storage area is written by the application running on a first application storage area with the bootloader updating file from the file storage area.

13. The method of claim 1, wherein the application is running on a first application storage area of the firmware, and wherein the first application storage area comprises the file storage area.

14. The method of claim 1, wherein an application provided outside of the controller is transferred to the restarted controller.

15. A computer system for a light, the computer system being connected to a power supply means by means of which it is supplied with an operating voltage, said computer system comprising at least one processor, at least one bootloader storage area, at least one application storage area, a file storage area, and optionally one or more energy stores, wherein a first bootloader file to be updated is stored in a first bootloader storage area, said computer system being configured for:
- receiving a bootloader updating programme packet from outside of the computer system, said bootloader updating programme packet comprising or being capable of generating a bootloader updating file which comprises either a complete up-to-date second bootloader file or programme parts supplementing the first bootloader file to form an up-to-date second bootloader file;
- storing the bootloader updating file in the file storage area of the computer system;
- determining an amount of voltage available to the computer system; and
- in the case of a sufficient minimum voltage being available to the computer system, writing the first bootloader storage area with the bootloader updating file from the file storage area;
- wherein said sufficient minimum voltage is such that the computer system remains supplied with the operating voltage or with a back-up voltage of the optional one or more energy stores for a period of time over which the computer system can perform the determining and the writing.

16. The computer system of claim 15, wherein the computer system is configured to determine by means of a controller-internal inquiry whether the sufficient minimum voltage is available to the computer system for the updating of the bootloader.

17. The computer system of claim 15, wherein the computer system stores a status variable, and wherein, in the case of the minimum voltage not being available to the computer system, the computer system is configured to change the status variable from a non-warning status to a warning status.

18. The computer system of claim 15, wherein the computer system is configured to perform at least one of the following: to write the first bootloader storage area with the bootloader updating file by means of an operation which comprises a single page write operation, to check whether the bootloader updating file written into the first bootloader storage area and the bootloader updating file from the file storage area are identical, or to delete the bootloader updating programme packet after the writing of the first bootloader storage area with the bootloader updating file from the file storage area.

19. The computer system of claim 15, wherein the computer system comprises at least one of the following: a transmitter-receiver radio module configured to receive the bootloader updating programme packet, a modem unit with a modem unit memory and a microcontroller unit with a microcontroller unit memory, the first bootloader storage area being part of the modem unit memory or of the microcontroller unit memory, the first application storage area being part of the modem unit memory or of the microcontroller unit memory, or the file storage area being part of the modem unit memory or of the microcontroller unit memory.

20. A method for updating a bootloader in a light, said method comprising:
- transferring to a computer system of the light a bootloader updating programme packet provided outside of the computer system and which comprises or can generate a bootloader updating file which comprises either a complete up-to-date second bootloader file or programme parts supplementing a first bootloader file stored in a first bootloader storage area of the computer system to form an up-to-date second bootloader file; said computer system being connected to a power supply means by means of which it is supplied with an operating voltage;
- storing the bootloader updating file in a file storage area of the computer system;
- determining an amount of voltage available to the computer system; and
- in the case of a sufficient minimum voltage being available to the computer system, writing the first bootloader storage area with the bootloader updating file from the file storage area;
- wherein said sufficient minimum voltage is such that the computer system remains supplied with the operating voltage or with a back-up voltage for a period of time over which the computer system can perform the determining and the writing.

* * * * *